United States Patent
Kieffer et al.

(10) Patent No.: US 9,933,321 B2
(45) Date of Patent: Apr. 3, 2018

(54) HIGH GAGE FACTOR STRAIN GAGE

(71) Applicant: Vishay Measurements Group, Inc., Wendell, NC (US)

(72) Inventors: Thomas P. Kieffer, Wake Forest, NC (US); Robert B. Watson, Clayton, NC (US)

(73) Assignee: VISHAY MEASUREMENTS GROUP, INC., Wendell, NC (US)

(*) Notice: Subject to any disclaimer, the term of this patent is extended or adjusted under 35 U.S.C. 154(b) by 16 days.

(21) Appl. No.: 14/712,602

(22) Filed: May 14, 2015

(65) Prior Publication Data

US 2016/0334289 A1    Nov. 17, 2016

(51) Int. Cl.
| | |
|---|---|
| *G01L 1/22* | (2006.01) |
| *G01B 7/16* | (2006.01) |
| *G01L 1/18* | (2006.01) |
| *H01C 1/16* | (2006.01) |
| *H01C 13/00* | (2006.01) |

(52) U.S. Cl.
CPC .............. *G01L 1/2287* (2013.01); *G01B 7/18* (2013.01); *G01L 1/18* (2013.01); *G01L 1/22* (2013.01); *H01C 1/16* (2013.01); *H01C 13/00* (2013.01)

(58) Field of Classification Search
CPC .................................. H01C 13/00; H01C 1/16
USPC ........................................................ 338/2, 47
See application file for complete search history.

(56) References Cited

U.S. PATENT DOCUMENTS

| | | | | |
|---|---|---|---|---|
| 2,899,658 A | * | 8/1959 | Bean, Jr. ................ | H01C 13/02 156/297 |
| 3,134,953 A | * | 5/1964 | Eisler ..................... | G01B 7/16 29/620 |
| 3,922,628 A | * | 11/1975 | Hudson ................... | G01B 7/18 29/621.1 |
| 4,325,048 A | * | 4/1982 | Zaghi .................... | G01L 1/2225 338/3 |
| 4,696,188 A | * | 9/1987 | Higashi .................. | H01L 27/16 257/419 |
| 5,184,516 A | * | 2/1993 | Blazic .................... | G01B 7/16 324/718 |
| 5,508,676 A | * | 4/1996 | Grange .................. | G01L 1/2287 338/2 |
| 5,915,285 A | * | 6/1999 | Sommer ................. | G01L 1/2287 338/2 |

FOREIGN PATENT DOCUMENTS

| | | |
|---|---|---|
| GB | 1001691 A | 8/1965 |
| JP | H02-43344 A | 2/1990 |

OTHER PUBLICATIONS

Franke, P. and Seifert, H.J., "The Influence of Magnetic and Chemical Ordering on the Phase Diagram of Cr—Fe—Ni" CALPHAD: Computer Coupling of Phase Diagrams and Thermochemistry 35(2011) pp. 148-154.

(Continued)

*Primary Examiner* — Kyung Lee
(74) *Attorney, Agent, or Firm* — Volpe and Koenig, P.C.

(57) ABSTRACT

A metal resistance strain gage with a high gage factor is provided. The electrical resistance strain gage includes a strain sensitive metallic element and has a chemical composition on a weight basis of approximately 63% to 84% Ni and approximately 16% to 37% Fe and a gage factor greater than 5.

25 Claims, 3 Drawing Sheets

(56) References Cited

OTHER PUBLICATIONS

Marwick, A.D.; Piller, R.C.; and Cranshaw, T.E. "The influence of Cr additions on the ordering of Fe—Cr—Ni alloys near the Ni3Fe Composition" J. Phys. F: Met. Phys. 17 (1987) pp. 37-45.
Meilhaus Eletcronic Gmbh: "Messbrückenverstärker für vier unabhängige Messbrücken mit Konstantstromspeisung", Meilhaus Electronik GmbH, Jul. 31, 2009, XP055303409, Retrieved from the Internet: URL: http://www.meilhaus.org/downloadserver/manuals/ME-BA4.pdf.
International Search Report PCT/US2016/032666 dated Sep. 16, 2016.

* cited by examiner

HIGH GAGE FACTOR STRAIN GAGE

FIELD OF INVENTION

The present invention relates generally to strain gages, and, more particularly to metal resistance strain gages having a high gage factor, which sometimes is referred to resistance-strain sensitivity.

BACKGROUND

Metal strain gages are used for sensing strain at a surface to which the strain gage is mounted. The amount of strain is determined on basis of the change in the electrical resistance of an electrical circuit in the strain gage. Typically, the circuit is formed by a thin metal foil or a thin metal conductor arranged in a serpentine pattern. As the surface under investigation is strained, deformation in the strain gage causes a change in the electrical resistance of the circuit. Strain gages are said to have a strain factor, resistance-strain sensitivity or a gage factor (GF).

The GF is the ratio of fractional change in electrical resistance to the mechanical strain. The GF can be represented by:

$$GF=(\Delta R/R)/\varepsilon$$

where $\Delta R$ is the change in resistance caused by the strain sensed by the strain gage, R is the resistance of the unstrained strain gage, and E is the strain. Additional details about the GF are available in ASTM E251.

For many metal resistance strain gages, the GF is no more than 4, and in many cases is 3 or less. In some applications, it is desirable to have a metal resistance strain gage with a GF greater than 5. Some of the benefits of a strain gage with a high GF are an enhanced signal to noise ratio and the ability to measure low levels of strain.

Among the known metal resistance strain gages, gages made from copper, nickel and manganese (Cu-44Ni-2Mn) have a GF of approximately 2; gages made from iron, nickel, and chromium (Fe-36Ni-7Cr) have a GF of approximately 3; and, gages made from platinum and tungsten (Pt-8W) have a GF of approximately 4. Metal resistance strain gages with a GF greater than about 4 have not been available; however, there are non-metal resistance strain gages available with a GF greater than 4, but they have disadvantages such as high resistance-temperature sensitivity (thermal output) and non-uniform properties from gage-to-gage. Furthermore these non-metal resistance strain gages are brittle and must be handled carefully to avoid breakage.

Accordingly, a need exists for a metal resistance strain gage with a GF of 5 or greater.

SUMMARY

The present invention provides a high gage factor strain gage with a GF of at least 5. The strain sensitive metallic element of the gage has a composition, on a weight basis, in the range of approximately 63% to 84% Ni and approximately 16% to 37% Fe. A preferred composition is 75% Ni and 25% Fe (a stoichiometric composition); and a more preferred composition of the Ni—Fe alloy corresponds with the binary $Ni_3Fe$ composition found in the $L1_2$ region of the NiFe phase diagram illustrated in FIG. 2.

In some embodiments, an alloying component is present in an amount that is less than about 10% of the chemical composition of the strain sensitive metallic element on a weight basis. The alloying component is preferably selected from among the group consisting of manganese, tungsten, molybdenum, chromium, and combinations thereof.

BRIEF DESCRIPTION OF THE DRAWINGS

Embodiments of the present invention are illustrated in the appended drawings wherein.

DETAILED DESCRIPTION

Figure 1:
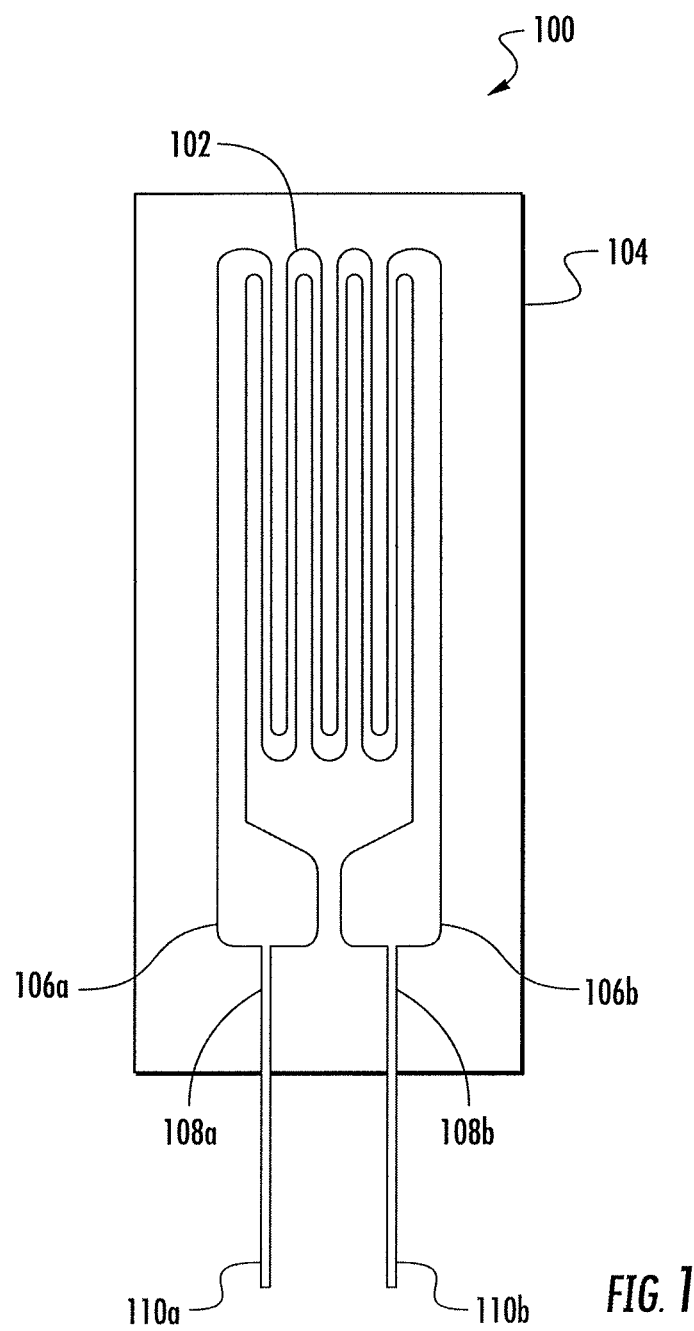
FIG. 1 illustrated a metal resistance strain gage in a configuration compatible with the present invention.

FIG. 1 illustrates a strain gage 100 in a configuration suitable for use with the present inventions. The strain gage 100 includes a serpentine strain sensitive metallic element 102 on an optional backing 104. The strain gage 100 includes connecting pads 106a, 106b for electrically the strain gage 100 to first ends of electrical leads 108a, 108b. Second ends of the electrical leads 110a, 110b are connected to known measurement instrumentation which applies an input signal to the strain gage and receives an output signal from the strain gage that corresponds with the strain induced in the strain gage 100.

The metallic element 102 of gage 100 may be formed as a wire, a foil and etched or cut into the desired shape, or a metal applied to a backing as a thin film, for example by thin film deposition. In each of these examples, the metallic element 102 is a metal with a chemical composition on a weight basis of approximately 63% to 84% Ni and approximately 16% to 37% Fe. The nominal chemical composition is 75% Ni and 25% Fe on a weight basis (a stoichiometric composition).

Figure 2:
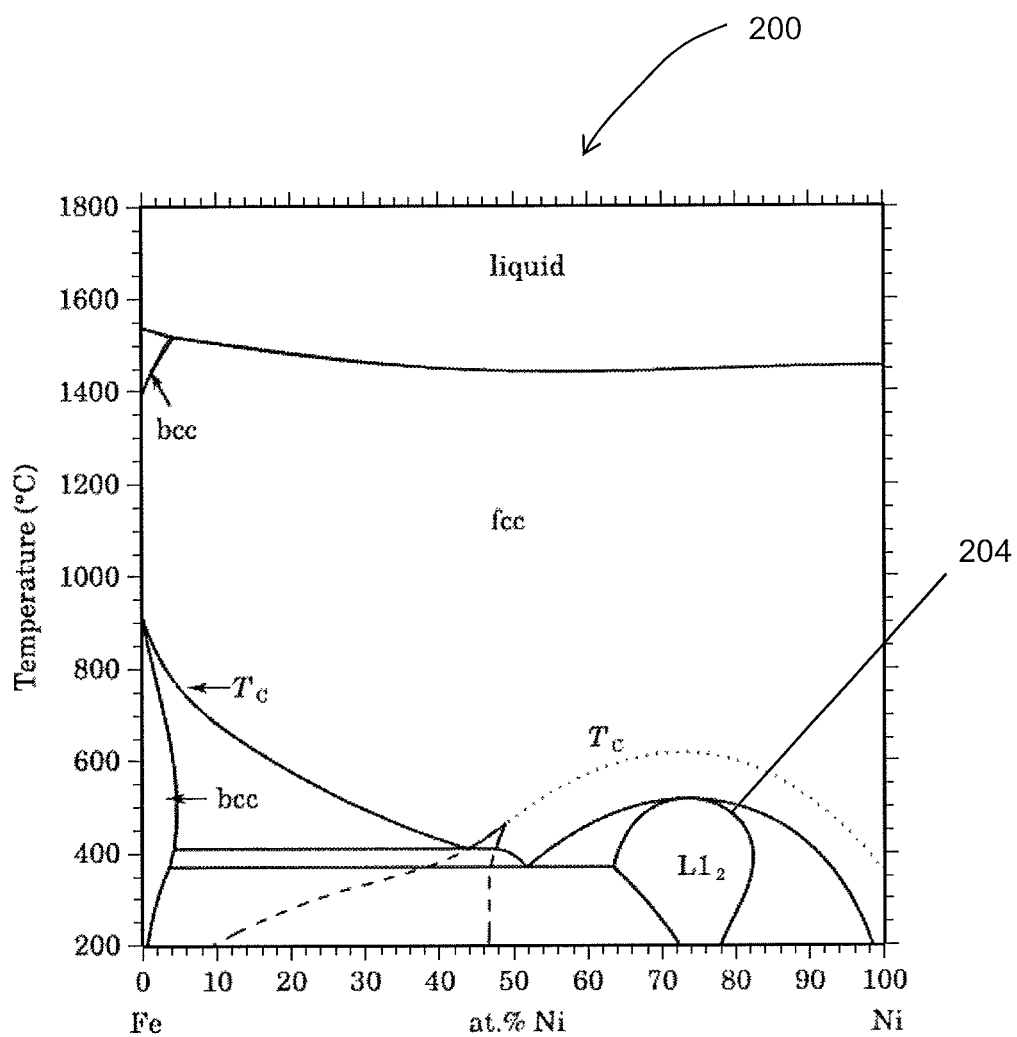
FIG. 2 is a phase diagram for a nickel iron alloy suitable for use with the present invention; and, FIG. 3 illustrated a face-centered-cubic lattice structure suitable for use with the present invention.
Figure 3:
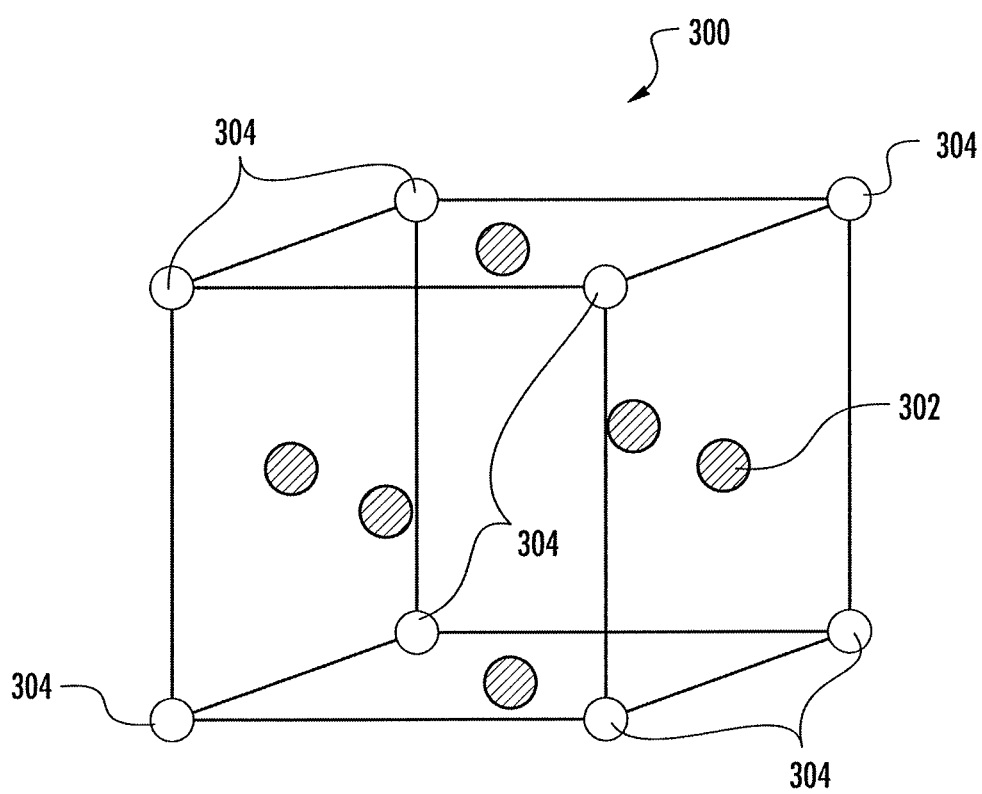

In a preferred embodiment, the Ni—Fe alloy corresponds with the binary $Ni_3Fe$ composition found in the $L1_2$ region of the NiFe phase diagram 200 illustrated in FIG. 2. With reference to FIGS. 2 and 3, the $L1_2$ region 204 in FIG. 2 is a Ni—Fe alloy that forms a face-centered-cubic crystal lattice 300 with nickel atoms 302 occupying face positions and iron atoms 304 occupying the corner positions as illustrated in FIG. 3. Some characteristics of this alloy, such as, strength, magnetism, corrosion resistance, and electrical resistance are well known. A commercially available alloy comprising approximately 70% Ni and 30% Fe is used for resistance temperature detectors (RTDs) because of its predictable change in electrical resistance as a function of temperature. However, such alloys had not been considered for use as a strain sensitive element in an electrical resistance strain gage.

As a result of the inventors' investigation and experimentation, Ni—Fe alloys were found to have characteristics, for example resistance-strain sensitivity (i.e., GF), that made them desirable for use in a strain gage and were unknown prior to the inventors' work. The inventors found that alloys with a nominal composition by weight of 75% Ni and 25% Fe could provide strain gages with a GF higher than that of known metal resistance strain gages. The inventors also established that binary Ni—Fe alloys within the $L1_2$ region 204 in FIG. 2 provided resistance strain gages with higher gage factors (i.e., a GF greater than 5).

By way of an example, it was found that cold working of the alloy, such as by rolling, followed by annealing increased the GF of the material to a value above 5. Rolling an alloy containing ranges of approximately 63% and 84% Ni and approximately 16% and 37% Fe by weight into a foil using known processes for foil gages and annealing at a temperature range between 600 and 900° F. for a time in the range of 1 and 16 hours yielded a strain gage with a GF that was increased over the GF of known metal resistance strain gages. In all embodiments, the GF increased to at least 5, and some embodiments had GF increase to 10 and 20. As noted earlier, the strain gage may be formed by drawing the alloy into a wire or metal film vapor deposition of the alloy in accordance with known techniques for forming strain gages.

Based upon their work, the inventors theorized that cold working and annealing facilitate the ordering of the Ni and Fe atoms in the alloy so that the Ni atoms occupy the face positions and the Fe atoms occupy the corner positions of a face-centered-cubic crystal lattice, as illustrated in FIG. 3.

It was also determined that beneficial results were observed by the addition of not more than 10% by weight of the ternary or higher order alloy of one of more alloying components. By way of an example, an alloy of between approximately 63% and 84% Ni and approximately 16% and 37% Fe (both by weight percent) with additions of manganese (Mn), tungsten (W), molybdenum (Mo), chromium (Cr), or combinations thereof, not exceeding 10% by weight of the alloy, provided at least one characteristic beneficial to the processing of the alloy into an electrical resistance strain gage. The individual additions of 1%-5% Mn, 0.5%-2% W, 1%-5% Mo, and 1%-5% Cr were observed to improve processing of the alloy into a high gage factor material. Again, it is theorized that at least some of the alloying additions facilitated ordering of the Ni and Fe atoms into a face-centered-cubic lattice 300 illustrated in FIG. 3.

In addition to providing an electrical resistance strain gage with a gage factor (GF) greater than 5, these strain gages have an enhanced signal to noise ratio, which may advantageously enhance the ability to measure low levels of strain previously difficult to measure with an electrical resistance strain gage. Additionally, the high gage factor (GF) makes it possible to achieve the same level of fractional resistance change ($\Delta R/R$) as a conventional prior art strain gage such as Cu-44Ni-2Mn but at substantially lower applied strain level ($\varepsilon$). This can provide several advantages including robustness and stability of the measurement system further comprised of the transducer spring element to which the high gage factor strain gage is attached.

What is claimed is:

1. An electrical resistance strain gage comprising:
   a strain sensitive metallic element having a chemical composition on a weight basis of approximately 63% to 84% nickel and approximately 16% to 37% iron and a gage factor of at least 5.

2. The strain gage of claim 1, wherein the strain sensitive metallic element further comprises metallic alloying additions in an amount that is less than about 10% of the chemical composition of the strain sensitive metallic element on a weight basis.

3. The strain gage of claim 2, wherein the alloying addition is manganese.

4. The strain gage of claim 3, wherein the manganese comprises about 1% to 5% of the alloy on a weight basis.

5. The strain gage of claim 2, wherein the alloying addition is tungsten.

6. The strain gage of claim 5, wherein the tungsten comprises about 0.5% to about 2% of the alloy on a weight basis.

7. The strain gage of claim 2, wherein the alloying addition is molybdenum.

8. The strain gage of claim 7, wherein the molybdenum comprises about 1% to about 5% of the alloy on a weight basis.

9. The strain gage of claim 2, wherein the alloying addition is chromium.

10. The strain gage of claim 9, wherein the chromium comprises about 1% to about 5% of the alloy on a weight basis.

11. The strain gage of claim 2, wherein the strain sensitive metallic element is a wire.

12. The strain gage of claim 11, wherein the wire is configured in a serpentine pattern.

13. The strain gage of claim 2, wherein the strain sensitive metallic element is a foil.

14. The strain gage of claim 13, wherein the foil is configured in a serpentine pattern.

15. The strain gage of claim 2, wherein the strain sensitive metallic element is a thin film.

16. The strain gage of claim 15, wherein the thin film is configured in a serpentine pattern.

17. The strain gage of claim 1, wherein the strain sensitive metallic element is a wire.

18. The strain gage of claim 17, wherein the wire is configured in a serpentine pattern.

19. The strain gage of claim 1, wherein the strain sensitive metallic element is a foil.

20. The strain gage of claim 19, wherein the foil is configured in a serpentine pattern.

21. The strain gage of claim 1, wherein the strain sensitive metallic element is a thin film.

22. The strain gage of claim 21, wherein the thin film is configured in a serpentine pattern.

23. The strain gage of claim 1, wherein the strain sensitive metallic element is cold rolled and annealed to achieve the gage factor of at least 5.

24. An electrical resistance strain gage comprising:
    a strain sensitive metallic element having a chemical composition on a weight basis of approximately 63% to 84% nickel, approximately 16% to 37% iron, and an alloying addition that is present in an amount no greater than 10% of the chemical composition of the strain sensitive metallic element on a weight basis and is selected from the group consisting of manganese, tungsten, molybdenum, chromium, and combinations thereof, with a gage factor of at least 5.

25. The strain gage of claim 1 An electrical resistance strain gage comprising:
    a strain sensitive metallic element having a chemical composition on a weight basis of approximately 63% to 84% nickel and approximately 16% to 37% iron and a gage factor of at least 5, wherein the material of the strain sensitive metallic element forms a face-centered-cubic crystal lattice with nickel atoms occupying face positions and iron atoms occupying corner positions.

* * * * *

UNITED STATES PATENT AND TRADEMARK OFFICE
CERTIFICATE OF CORRECTION

PATENT NO. : 9,933,321 B2
APPLICATION NO. : 14/712602
DATED : April 3, 2018
INVENTOR(S) : Thomas P. Kieffer and Robert B. Watson Page 1 of 1

It is certified that error appears in the above-identified patent and that said Letters Patent is hereby corrected as shown below:

In the Claims

In Claim 25, at Column 4, Line 52, delete "The strain gage of claim 1"

Signed and Sealed this
Tenth Day of September, 2019

Andrei Iancu
*Director of the United States Patent and Trademark Office*